US008550139B2

(12) United States Patent
Cooper et al.

(10) Patent No.: US 8,550,139 B2
(45) Date of Patent: Oct. 8, 2013

(54) LABEL SEPARATION AND APPLICATION APPARATUS AND METHOD

(75) Inventors: Michael Cooper, Colchester (GB); David Ashmore, Essex (GB)

(73) Assignee: Catchpoint Limited (GB)

( * ) Notice: Subject to any disclaimer, the term of this patent is extended or adjusted under 35 U.S.C. 154(b) by 288 days.

(21) Appl. No.: 12/676,998

(22) PCT Filed: Sep. 3, 2008

(86) PCT No.: PCT/GB2008/002970
§ 371 (c)(1), (2), (4) Date: Apr. 29, 2010

(87) PCT Pub. No.: WO2009/030893
PCT Pub. Date: Mar. 12, 2009

(65) Prior Publication Data
US 2010/0218888 A1 Sep. 2, 2010

(30) Foreign Application Priority Data
Sep. 8, 2007 (GB) .................................. 0717525.0

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC .......... 156/521; 156/513; 225/96.5; 225/100; 225/104

(58) Field of Classification Search
USPC ................. 156/521, 513, 557, 252, 264, 270; 225/96.5, 100, 104; 83/436.7, 436.75, 505
See application file for complete search history.

(56) References Cited

U.S. PATENT DOCUMENTS

| | | | | |
|---|---|---|---|---|
| 1,914,261 | A * | 6/1933 | Kingsbury | 225/100 |
| 2,420,525 | A * | 5/1947 | Deloye | 225/96 |
| 2,678,748 | A * | 5/1954 | McCain et al. | 156/521 |
| 4,397,410 | A * | 8/1983 | Schueler | 225/98 |
| 5,536,546 | A | 7/1996 | Nash | |
| 5,540,369 | A | 7/1996 | Boreali et al. | |

FOREIGN PATENT DOCUMENTS

| | | |
|---|---|---|
| EP | 0 621 561 A2 | 10/1994 |
| JP | 11189229 | 7/1999 |
| WO | WO 01/56911 A1 | 8/2001 |

OTHER PUBLICATIONS

International Search Report, PCT/GB2008/002970, Catchpoint Limited, Dec. 23, 2008, 2 pages.

* cited by examiner

*Primary Examiner* — Linda L Gray
(74) *Attorney, Agent, or Firm* — McKee, Voorhees & Sease, P.L.C.

(57) ABSTRACT

The invention which is the subject of this application is apparatus and a method for the application of labels to articles-, via adhesive or other mechanical location means. The labels are provided in a label supply (2) with respective labels (8) defined by a line of weakening (6) formed by slits (12) or perforations and the line of weakening includes at least one aperture (12) provided for engagement by a tool (12) at the time when the line of weakening is required to be broken to separate the leading label and allow the same to be applied to the article.

11 Claims, 8 Drawing Sheets

LABEL SEPARATION AND APPLICATION APPARATUS AND METHOD

Figure 1A:
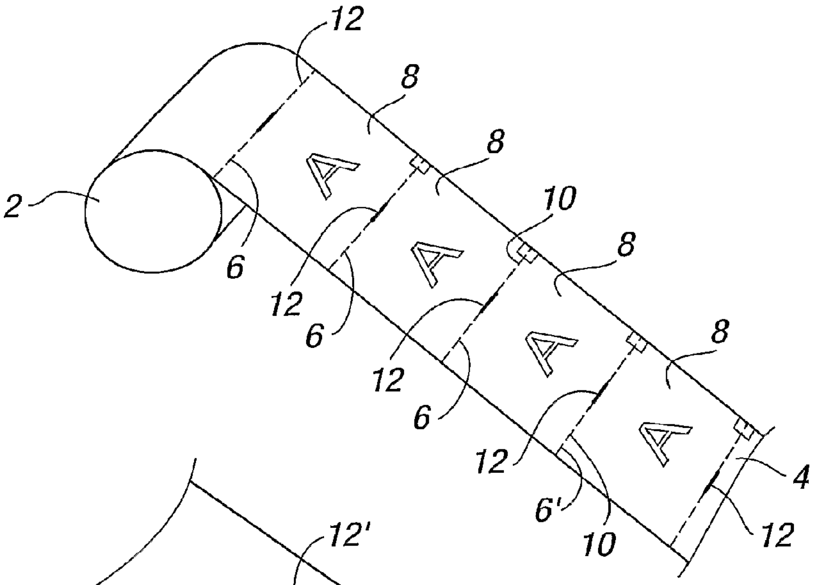

The invention to which this application relates is to apparatus and a method for separating and applying labels from a label supply onto at least one article.

The applicant in their co-pending applications have defined the provision of a supply of labels in a form known as "linerless". Each label is defined in the label substrate by at least one line of weakening which is required to be broken in order to allow the label to be separated and therefore be applied to an article. The labels have on one side a release coating and on the opposing side a layer of adhesive. This arrangement means that no backing layer is requited to be provided to lie intermediate the layers of labels and so wastage of material is significantly reduced in comparison to conventional label supplies which include the label substrate and a backing substrate from which the label substrate is required to be removed prior to being applied to an article.

One problem which is faced in the use of the linerless label system is how best to separate the label from the label supply by breaking a line of weakening which defines the label. The line of weakening is conventionally defined by a series of micro perforations. Although, once the initial break has been created, the perforated line will break more easily, the force required to cause the initial break to occur can be significantly higher and, in certain instances, may be such as to cause another portion of the label substrate to tear rather than the line of weakening.

Furthermore when supplying a label supply to the point of application, if the label is linerless the same is typically carried on a belt which has a release material thereon so as to be able to carry the label supply with the adhesive face of the label supply in contact with the belt and to be releasable therefrom. If the label supply is not linerless but instead has a backing layer the technical measurement of a "release value" of the surface tension between the adhesive and the silicone is required to be calculated and suppliers of this type of label supply offer a wide range of material specifications. These release values have an effect on the accuracy of label application since they alter the separation profile of the self adhesive label as it dispenses at the beak onto the container. The moment of separation can alter the angle at which the leading edge of the label approaches the container and hence the exact point of contact. This same release issue is known to affect linerless labels separating from a release belt. The effect on accuracy of labelling is greater since most of the release belts require a larger radius at the point of separation if the belt is not to suffer unacceptable wear. It will be appreciated therefore that this problem can introduce particularly tight and difficult to obtain tolerances in the application of labels accurately.

A further problem which is created by the strength of the perforations and the breakage of the same is in the conversion or printing of the label.

A yet further problem is that if the tearing of the line of weakening commences from one side then if the line of weakening is across a relatively wide label, the time taken to tear along the line of weakening is such as to cause delays in the label application procedure and may even, in certain circumstances, cause the use of labels of this type to be impractical in certain instances.

It has been known previously to attempt to encourage the break to commence at one edge of the label by providing a longer "slit" at the edges of the perforated line to encourage the break to commence at the edge of the line of weakening. This is shown in the U.S. Pat. No. 5,536,546

It is also known to pass the label supply between first and second sets of "nip" rollers and then to selectively control the speed of operation of the two sets at different speeds so as to cause an increased force to be applied to the line of weakening which is positioned between the two sets of rollers.

The use of a blade which contacts with the label supply to encourage a tear is known from U.S. Pat. No. 5,540,369 but the blade does not engage or locate in the label supply and therefore does not provide a practical solution.

None of these known systems are found to be effective and therefore the aim of the present invention is to provide a means whereby the separation and application of labels can be achieved effectively and efficiently.

In accordance with a first aspect of the invention there is provided apparatus for the separation of a label from a label supply, said apparatus including means for advancing a label supply to a point of label application, said label supply having a series of labels defined therein by lines of weakening, and means for separating the leading label from the supply of labels to allow the same to be applied to an article, wherein said means for separating include a tool positioned such that at least one protruding portion of the tool contacts and locates with an aperture formed along the line of weakening so as to commence the breaking of the line of weakening.

In one embodiment the breaking of the line of weakening is commenced once a portion of the label has been applied to the article, subsequent movement of the article and label bringing the line of weakening into contact with the tool and the protruding portion of the same into engagement with the at least one aperture in the line of weakening and thereafter movement of the label and article causes the line of weakening to be broken and the label released to be fully placed with the article.

In one embodiment the label is applied to the article via attachment of a layer of adhesive on the label and/or article. Alternatively the label is mechanically located on the article, such as by placing the label around the neck of a bottle.

In an alternative embodiment the leading label is freed from the supply of labels using the tool in accordance with the invention prior to the label being in contact with said article to which it is subsequently to be applied. In certain instances this is required to allow a differential speed of label movement which, for example, is required to match a requirement for the overprinting of a label and the speed at which the article is travelling. One example of this is the use of air to blow the label into application with the article.

In an alternative embodiment, the label supply is fed through first and second sets of rollers, and the line of weakening which is to be broken is located between the two sets, with a tool located between the two sets at a position such that the protruding portion thereon engages with the at least one aperture formed along the line of weakening.

Typically the contact between the protruding portion and the at least one aperture in the line of weakening is encouraged by the selective drive and/or drive speed of the first and second sets of rollers.

In an alternative embodiment the tool is provided to be relatively movable with respect to the label supply so as to allow the protruding portion on the tool to be selectively moved into the at least one aperture in the line of weakening.

In one embodiment there is provided a support plate which lies between the first and second sets of rollers and towards which the label supply is encouraged to be positioned, in one embodiment by an airflow directed thereon. Typically the support plate has an aperture shaped so as to allow the tool to pass therethrough and into contact with the label supply to break the line of weakening.

In one embodiment the tool includes two or more spaced protruding portions, each portion provided to be locatable in a respective aperture formed along the line of weakening at the same spacing.

Typically the tool portion is shaped and profiled with respect to the number of apertures provided along the line of weakening which are to be engaged, and the speed of feed of the labels, so as to ensure the breaking of the line of weakening is encouraged to occur within a required time period. In addition, the number of apertures provided along the line of weakening may be selected so as to determine the length of the portions of the line of weakening which lie between said apertures and again therefore determine the time which will be taken to break the line of weakening as each of these portions can be broken simultaneously. Typically the speed of feed of the labels will be substantially the same as the speed of feed of the articles to which the labels are to subsequently be applied.

In one embodiment the tool is provided in conjunction with means for applying the label to the article. In one embodiment there is relative movement between the tool and said means during one cycle of operation of the apparatus. In this embodiment the relative movement is provided so as to allow the leading edge of the leading label to be held in a defined position and then applied to the article accurately whereupon the trailing edge of the leading label is separated from the label supply via the tool breaking the line of weakening in accordance with the invention.

Typically, in whichever embodiment the line of weakening is formed by a series of perforations which defined the line and said line further includes at least one aperture which is provided to receive the protruding portion of the tool therein so as to commence the breaking of the line.

Typically the at least one aperture is of a different size and/or shape to the perforations.

In one embodiment the protruding portion of the tool engages with the said aperture by passing into the aperture, and, in one embodiment, can pass through the aperture so as to protrude from the other side of the label from which the tool is positioned. In any case the location of the protruding portion in the aperture, causes the portion to contact with one of the walls of the aperture and hence, this contact in conjunction with the movement of the label, apparatus and/or tool encourages the commencement of a tearing action at the aperture which then passes along the line of weakening to remove the label from the label supply.

In a further aspect of the invention there is provided a supply of labels formed as an elongate substrate, each of said labels defined in the substrate by at least one line of weakening formed by a series of spaced perforations and wherein intermediate the first and second ends of said line of weakening there is provided at least one aperture which is provided for the location of a tool portion therewith.

Typically the aperture is of a shape and/or dimension which is different to the perforations of the line of weakening.

In one embodiment the said at least one aperture has at least one dimension greater than that of the adjacent perforations. In one embodiment said aperture or apertures are spaced equally inwardly from the ends of the line of weakening. If more than one aperture is provided, the same are typically all located intermediate the ends of the line of weakening.

In one embodiment the supply of labels is provided in a linerless form, with a first planar surface having a release layer applied thereto, and the opposing planar surface having a layer of adhesive applied to at least a portion thereof.

In an alternative embodiment each of the labels in the supply of labels is provided with a location means formed therein, such as a passage therethrough, said passage provided so as to be placed onto the article and to locate the label therewith. This embodiment therefor means that adhesive is not required to be provided to allow the label to be applied to the article and instead the location means can be used.

Typically the said aperture in the line of weakening is provided of a shape and dimension so as to receive a tool portion therein at the time of separation of the leading label from the supply of labels.

Typically the remainder of the perforations on the line of weakening are micro perforations. In one embodiment the width of the aperture is substantially the same as the width of the adjacent perforations.

In one embodiment there is provided a tool, also referred to as a blade, which has a protruding portion formed and positioned, or brought into position, to engage with the said aperture.

Typically the said tool edge extends across the length of the line of weakening so as to further encourage the line of weakening to break. In one embodiment the protruding portion of the tool, in addition to locating in the said aperture, also acts to commence to tear at least one of the bridge portions which lies to either side of the said aperture. This therefore further serves to improve the tearing of the line of weakening.

Typically the engagement of the portion of the tool with the said aperture is used to commence the breaking of the line of weakening and hence lead to the separation of the label from the label supply.

In one embodiment, for each label in the label supply there is provided extraneous label material which is removed once the said line of weakening has been broken.

In one embodiment, each label is defined by a plurality of lines of weakening, joined together such that when broken, the label can subsequently be applied to an article. In this embodiment at least one of the said lines of weakening will be formed in accordance with the invention to have at least one aperture, and may typically be the line of weakening which defines the leading edge, or trailing edge, of each label.

In a further aspect of the invention there is provided a supply of labels formed as an elongate substrate, each of said labels defined in the substrate by at least one line of weakening formed by a series of spaced perforations and wherein intermediate the first and second ends of said line of weakening there is provided at least one aperture which is provided for the location of a tool portion therewith such that once engagement is achieved, the line of weakening is encouraged to commence to tear or break at a location intermediate the ends of said line of weakening.

By providing the commencement of the tear from a location intermediate the ends so the distance of tear, and hence time required for the tear operation, can be controlled regardless of the length of the line of weakening. For example if the line of weakening is relatively short, only one aperture is provided with the tool having one matching protruding portion. However, if the line of weakening is longer, a plurality of apertures can be provided at spaced intervals, with the blade having matching spaced protruding portions. In this way, the line of weakening can be simultaneously encouraged to tear from each aperture thereby ensuring that any one tear line between the edge and an aperture, or between apertures, in the line of weakening is still relatively short and hence the time for the complete line of weakening to be torn is relatively short.

In a further aspect of the invention there is provided a method of separating a label from a label supply, said, method comprising the steps of advancing a label supply to bring the leading edge of a leading label to a point of application onto an article, defining each label by at least one line of weakening formed in the label supply, the separation of each label being achieved by breaking the respective line of weakening between the leading label and the following label and wherein the line of weakening includes at least one aperture which, in order to commence breakage of the line of weakening, is engaged by a portion of a tool and subsequent movement of the label, and/or tool and/or a change in tension of the label supply, causes the line of weakening to break from the at least one aperture location.

In one embodiment the movement of the label is caused by the application of a portion of the label to a moving article prior to removal of the label from the label supply.

In an alternative embodiment the movement and/or change in tension is created by the selective control of operation or speed of movement of at least one set of rollers located proximate to the location of the line of weakening at the time of breakage of the same.

Thus in one embodiment as the tool portion is engaged into the aperture, the infeed web slows, initiating the tear.

In one embodiment the tool is provided with a 3 dimensional profile portion and first and second sets of rollers are provided, a first set on one side of the line of weakening which is to be broken and a second set on the opposing side of the said line of weakening. The tool profile is typically provided so that it effectively matches the distance the label perforation travels forward during the time the now separating label moves away. This creates a gap between labels and the blade is withdrawn from contact with the label supply at the final separation. The new leading edge of the label is advanced to the second set of rollers and is accelerated to a speed for application to the article to which that label is to be applied.

In one embodiment the apparatus is operated in a "semi automatic mode where the label is delivered by a feed belt to a stop position aligned to the line of weakening The label may be printed whilst, on the belt and the line of weakening is broken by an operator tearing the label off against the tool portion by lifting and pulling the exposed label with the protruding portion of the tool engaging in the at least one aperture in the line of weakening.

In a further embodiment the invention is incorporated into a label hand gun in which a hand operated ratchet is used to index one label and overprint the same with relevant information such as an item price. In this case a feed belt is provided with one or more protrusions at spaced intervals so as to engage with the respective apertures in the lines of weakening. The overprinted and forward indexed leading label may then be positioned adjacent to a roller, with the protruding portion brought into engagement and acting to break the label free as the operator "wipes" the hand gun onto the article to apply the label to the article and, at the same time, provide the relative movement to cause the tool to locate in the aperture and hence break the line of weakening. A roller can be provided to assist the application of the label and this can be positioned so that the angle of the label is changed as the label was placed on the pack. Movement of the ratchet mechanism by the operator delivers the next label.

Figure 1B:
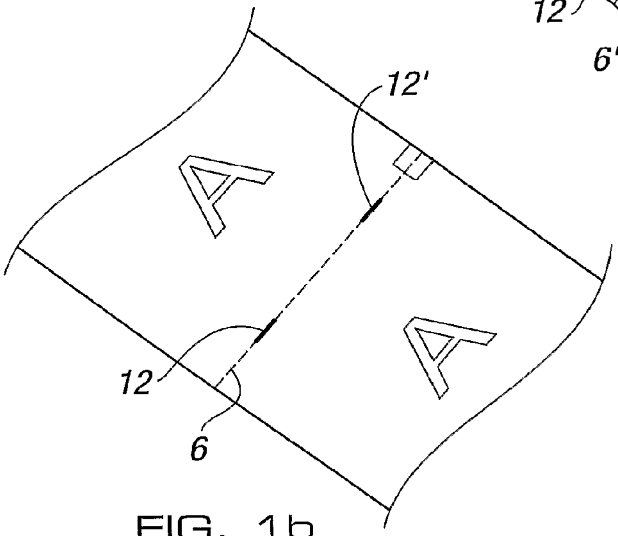
Figure 1C:
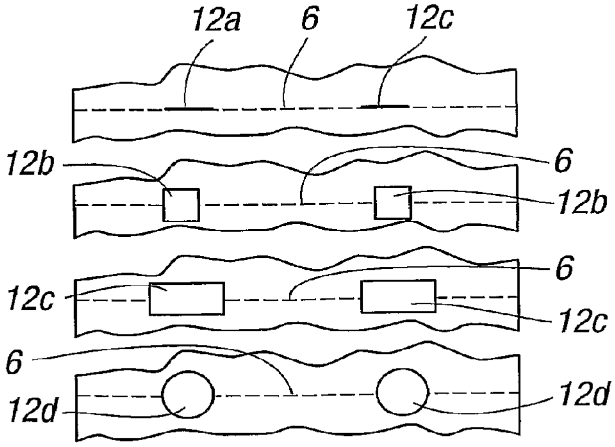

Specific embodiments of the invention are now described with reference to the accompanying drawings wherein;

FIG. 1*a* illustrates a supply of labels in accordance with one embodiment of the invention;

FIG. 1*b* illustrates a detailed view of a line of weakening of a supply of labels in accordance with a second embodiment of the invention;

FIG. 1*c* illustrates a range of aperture forms in accordance with the invention.

Figure 2A:
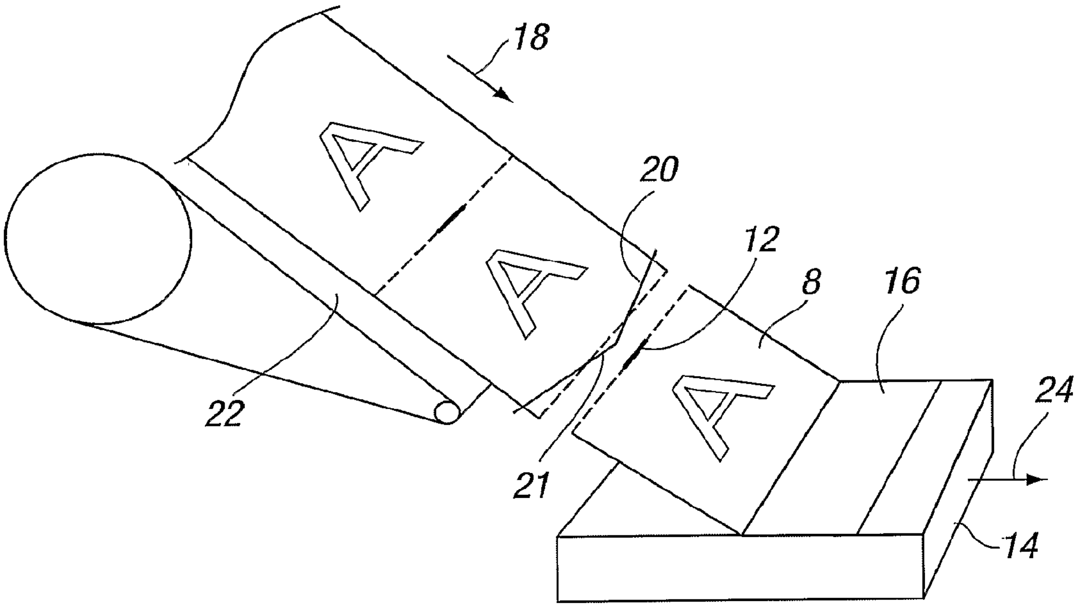
Figure 2B:
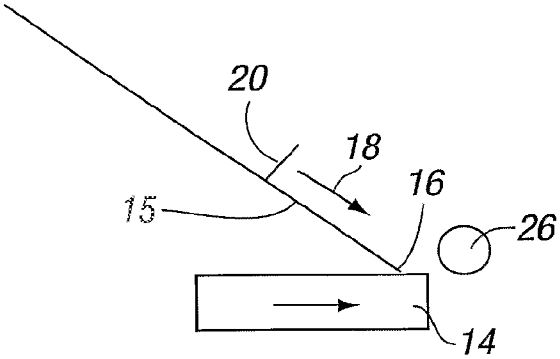
Figure 2C:
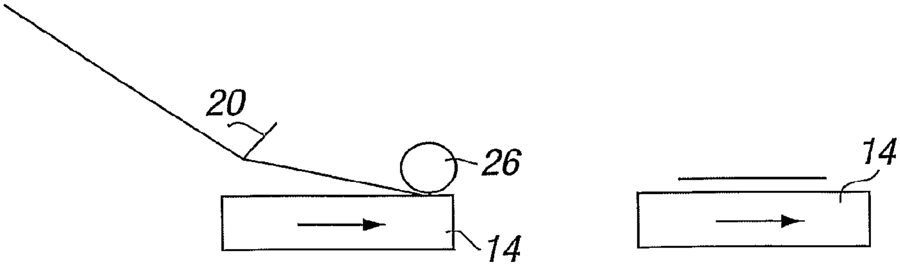
Figure 3:
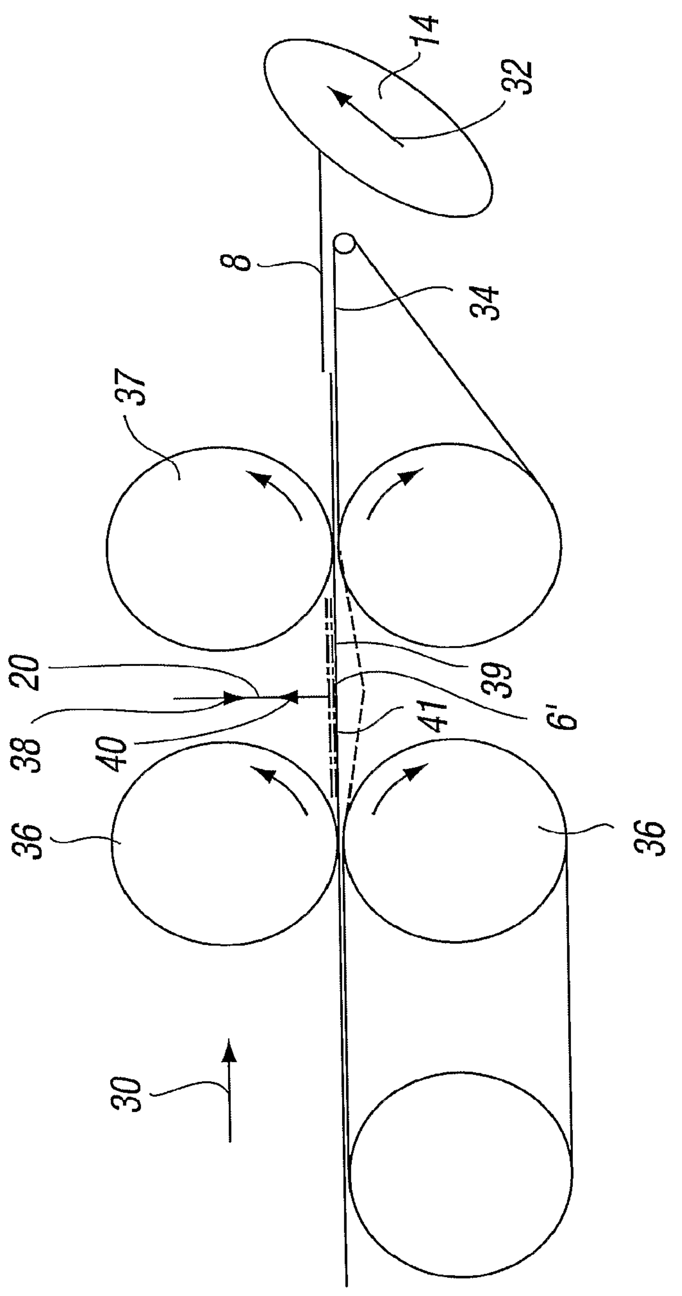
Figure 4A:
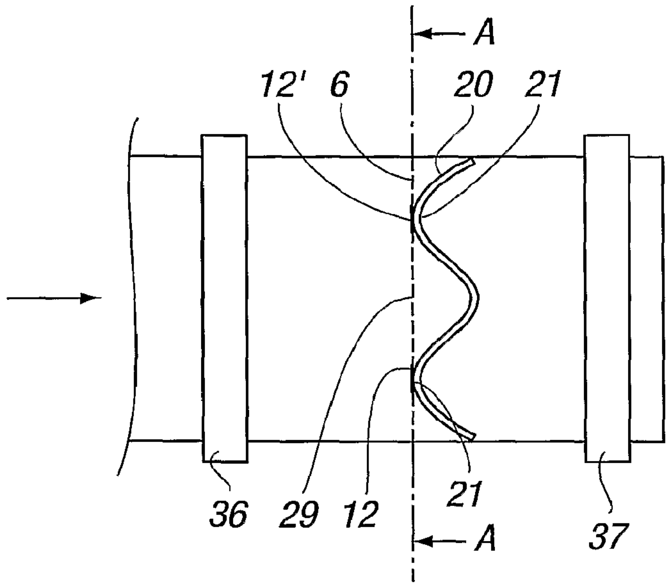
Figure 4B:
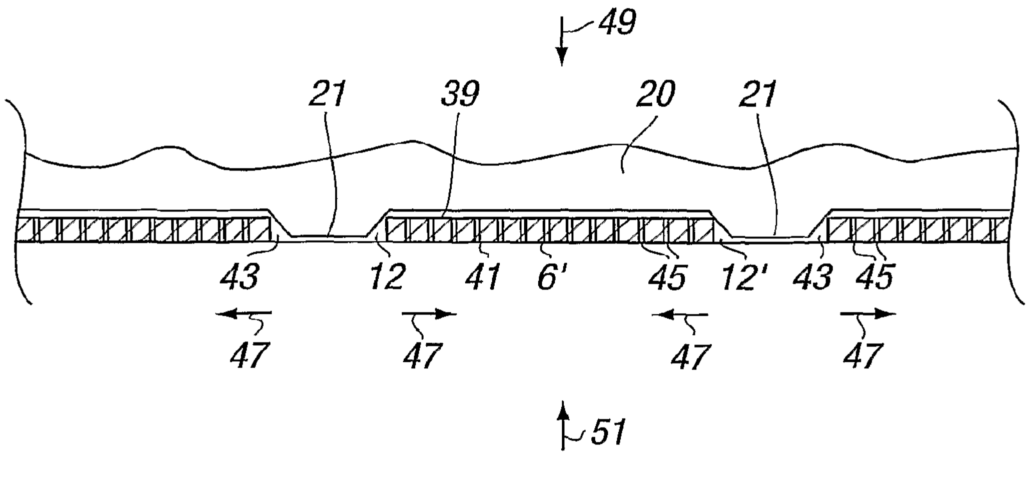
Figure 5A:
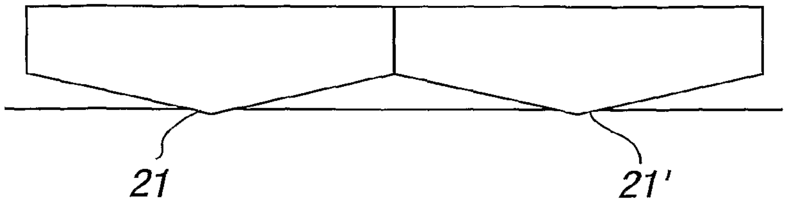
Figure 5B:
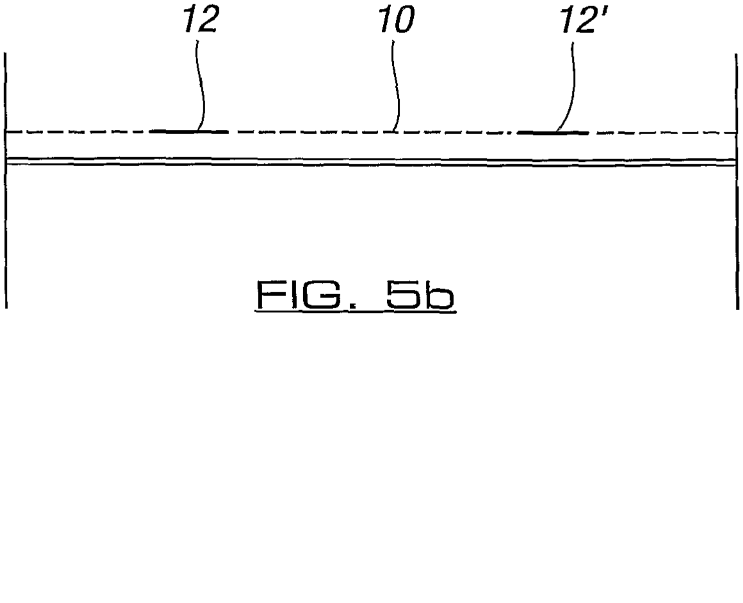
Figure 5C:
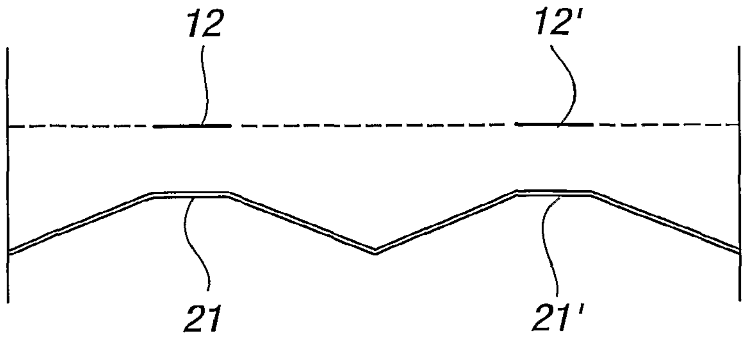
Figure 6:
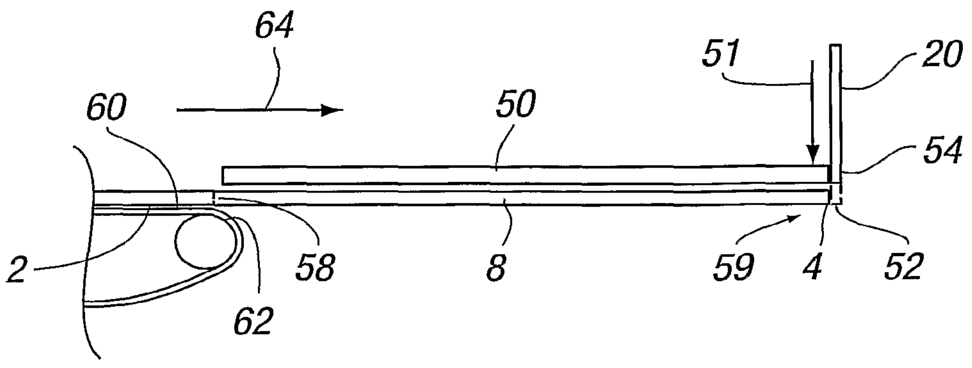

FIGS. 2*a-c* illustrate one embodiment of the separation and application of a label in accordance with the invention;

FIG. 3 illustrates an alternative embodiment in accordance with the invention;

FIG. 4*a* illustrates a profile of a blade in plan of a type which may be used in conjunction with the apparatus of FIG. 3;

FIG. 4*b* illustrates the protruding portion of a tool in engagement with an aperture in a cross section across a label supply, FIGS. 5*a-c* illustrate yet further embodiments of the invention;

FIG. 6 illustrates a yet further embodiment of the invention; and

Figure 7A:
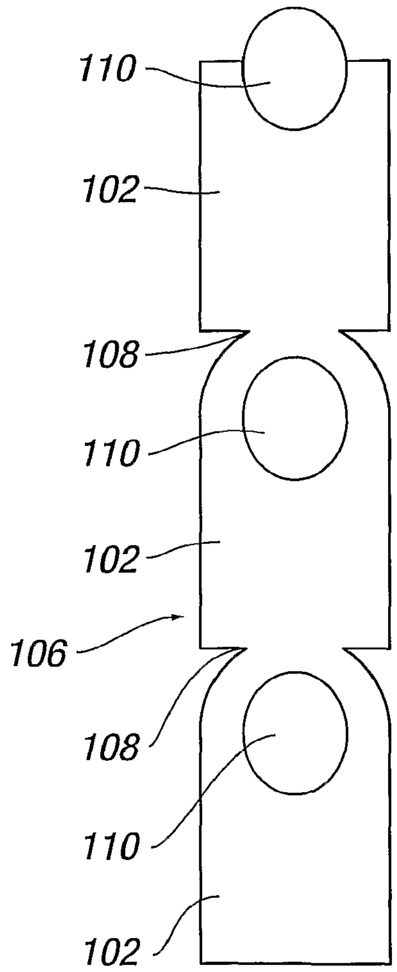

FIGS. 7*a* and *b* illustrate an embodiment of the invention for the application of non adhesive labels.

Referring firstly to FIGS. 1*a* and *b* there are shown two embodiments of a supply of labels in accordance with the invention. The supply is provided as a roll or reel 2 which has a leading edge 4 which is fed towards a point of application to an article by feed apparatus which can be of a conventional form and therefore is not described in detail herein.

At least the interface between respective labels in the supply are defined by lines of weakening 6. The lines of weakening are defined by micro perforations 10 and in the case of FIG. 1*a*, aperture 12, and in the case of FIG. 1*b* apertures 12, 12'. FIG. 1*c* illustrates a range of possible aperture 12 shapes which can, as shown, be a slit 12A, square 12*b*, rectangle 12*c* or circle 12*d*. It should also be appreciated that any other suitable aperture shape can be provided to suit specific requirements. However it is found that the use of wider apertures rather than thin slits allows greater tolerance in locating the tool portion with the aperture.

In this case the supply of labels is linerless in that there is no backing layer provided. Also, if required the labels can have a planar face A with a release layer applied thereto and the opposing planar face has a layer of adhesive applied thereto.

At, or prior to, the application of the label at the leading edge of the supply to an article, the label has to broken away from the label supply along the leading line of weakening 6'. The manner in which this can be achieved in accordance with the invention is now described.

Referring firstly to FIGS. 2*a-c* there is illustrated one embodiment of label application in which an article 14 is shown to which the label is to be applied. FIG. 2*b* illustrates the leading edge 16 of label 15 as it is fed in the direction of arrow 18 towards the article 14. As it does so it passes a tool 20 mounted such that at this stage it is not in contact with the label.

FIG. 2*a* illustrates the transport belt 22 which moves the label supply in direction 18 such that the leading edge 16 of the label contacts and adheres to the article 14 which is moving in the direction 24.

Once the leading edge is in adherence on the article 14, the movement of the article in direction 24 and the pressing action of roller 26 causes the label supply to be moved into contact with the tool 20 as shown in FIG. 2*c*. By correctly timing and synchronising the movement of the article and the label supply so the tool 20, which has a protruding portion 21 dimensioned so as to be received within the aperture 12 in the line of weakening 6', engages that line of weakening at this stage.

The engagement of the protruding portion 21 in the aperture means that in conjunction with the movement of the label 8 with the article 14, the force which is created is sufficient as to correctly start the breaking of the line of weakening at the aperture and then spread the break or tear along the line of weakening. The blade 20 typically extends along the length of the line of weakening. Once the line of weakening is broken the article with the label 8 fully applied moves away and the sequence is repeated for the next label and article and so on.

FIG. 3 illustrates an alternative embodiment of the invention. In this case the label supply is advanced in the direction 30 towards an article 14 which is moved in direction 32 such that the freed label 8 can be fed to the same by belt 34 and applied to the article. In this case the label supply passes through a first set of rollers 36 and a second set of rollers 37 and the tool 20 with protruding portion 21 is located intermediate the sets of rollers.

In this case the tool moves reciprocally as indicated by arrows 38, 40 towards and away from the label supply.

The sequence of operation is that the leading edge of the label is formed at point B when the previous label 8 is separated. This leading edge is then advanced through the roller set and tension in the label supply is created between the roller sets by controlling the speed of the rollers and the leading line of weakening 6' is then positioned under the tool.

The tool 20 is then moved downwardly such that the protruding portion engages in the aperture 12. Continued driving of the roller set 37 then encourages the line of weakening micro perforations 10 to break and hence separates the next label 8 from the label supply.

In one embodiment there is provided a support plate 39 (shown in broken lines) This support plate is positioned between the first and second roller sets. The label supply is encouraged towards contact with the support plate which lies substantially in the same plane as the preferred path of the label supply between the said sets of rollers. The support plate is provided with an aperture to allow the tool 20 to pass therethrough and into contact with the aperture 12 in the line of weakening as required and described above. The label supply is encouraged to move towards the support plate 39 by the application of an air flow in the direction 41 so as to provide the label supply and line of weakening in the correct position.

FIG. 4*a* illustrates a further embodiment in which the same sequence of operation as for FIG. 3 can be utilised and shows a possible movement sequence of the tool 20 with regard to a leading line of weakening 6'. In this case the tool 20 is provided with two protruding portions so as to engage with apertures 12 along the line of weakening in the configuration shown in FIG. 1*b*. It will be seen that the tool is profiled such that once the engagement with the apertures 12, 12' has occurred with the protruding portions 21 of the tool, the tool is shaped so as to remain in contact with the line of weakening until it is completely broken and as the movement of the label supply continues, although for a period of time the speed of roller set 36 is slowed relative to the speed of roller set 37. When the line of weakening is broken to release the leading label, the tool 20 disengages and the new leading edge 29 of the label supply is then advanced to the roller set 37. Once the roller set 37 is reached, the speeds of roller sets 36 and 37 are matched.

Referring now to FIG. 4*b* there is illustrated the tool 20 of FIG. 4*a* in position in apertures 12, 12' of the line of weakening 6' in cross section along line AA. It is shown how the protruding portions 21 locate with the respective apertures 12, 12'. The portions in this case pass substantially though the aperture from the surface 39 of the label to opposing surface 41 such that movement of the label supply forward and/or movement of the tool forward causes the protruding portion to contact with the wall 43 of the aperture and encourage the breaking of the perforations 45 which define the line of weakening 6' in the direction of arrows 47 outwardly from the apertures 12, 12'. In an alternative, or in addition, movement of the tool downwardly 49 or the label supply upwardly 51 to move the line of weakening and tool together and hence move the protruding portions 21 further into the apertures 12, 12' is used to commence the breaking of the line of weakening in the direction of arrows 47.

Referring now to FIGS. 5*a* to *c* there is illustrated a further embodiment of a tool 20 formed so as to allow the line of weakening configuration shown in FIG. 1*b* to be broken. In this case there are two apertures 12, 12' to be broken and the tool is provided with protrusions 21, 21' spaced accordingly.

As shown in FIG. 5*c* the tool protrusions 21, 21' can be profiled to allow the micro perforations 10 to break as the applied label accelerates relative to the advance of the next label. Once a preset distance is established between labels the speeds of the roller sets 36, 37 are brought back to be the same.

FIG. 6 illustrates a more detailed view of one form of a tool arrangement in accordance with the invention in end elevation. The arrangement described is of particular use where it is necessary to be able to accurately locate the position of the label with respect to the article to which it is to be applied. One particular form of application where this is particularly important is with respect to the application of labels to opposing sides of an article, such as, for example, the application of labels from label supply 2 to the front of the article and from another label supply (not shown) to the rear of the article such as a bottle. It should therefore be appreciated that the arrangement shown can be repeated for the application of a label to the opposing side of the article, at the same time.

In this case the tool 20 is provided in conjunction with a means 50 which is used, in conjunction with the tool to break the line of weakening, accurately position the label with respect to the article and apply the label.

The label supply 2 is provided to the application location on a belt 60 with a release material coating so as to support the adhesive side of the label supply. The label supply leaves the end 62 of the belt and passes on to the underside of the support and movement means 50 in the direction indicated by arrow 64. If required an air flow may be blown on to the adhesive side of the label supply 2 to encourage the same to contact with the support and movement means.

As shown, the leading edge 4 of the label supply 2, which leading edge is formed by the separation of the previous label using the tool 20, is provided in a known position with respect to the tool assembly and so the position of the leading edge can be accurately determined. It is envisaged that relative movement between the tool 20 and the support and movement means 50 is required and in the embodiment shown the tool protruding portion 21 is movable between a breaking position 52 shown in broken lines and the withdrawn position 54. The tool is in the withdrawn position when the leading edge 4 of the label supply is located and hence can be applied at the desired location on the article as the position of the leading edge is known and the article is introduced as indicated by arrow 59 so as to contact the adhesive face of the leading edge which adheres thereto. The label leading edge can be encouraged to be applied into contact with the article by the movement of the means 50 downwardly as indicated by arrow 51 as the article approaches the application position.

With the leading edge located on the article, the continued movement of the article in direction 59 moves the label supply such that the trailing edge 58 of the leading label 8 reaches the tool 20. At this stage the tool will have been moved to the position 52 so that the protruding portions 21 thereon can engage with the one or apertures 12 provided at the line of weakening which defines the trailing edge of the leading label. Continued movement of the leading label 8 onto the article causes the line of weakening to be broken by the tool, hence allowing the freed leading label to move away with the article. This leaves the newly defined leading edge of the next label accurately positioned at the tool 20 and the tool can be moved to the withdrawn position 54 and the application cycle can be repeated for the next label and so on.

FIGS. 7*a* and *b* illustrate another embodiment of the invention. In this case the labels 102 which are to be applied are in the form of single, double or triple ply hang tag which is to be applied to an article such as a bottle or other shaped article 104. In this case the label tags are provided in a line of labels 106 as shown in FIG. 7*a* and joined together by respective lines of weakening 108, each having at least one aperture (not shown) in accordance with the invention. Each label also has a passage 110 which is to be located onto the article, thereby allowing the label tag to be applied thereto. The labels may printed on one or both sides.

Figure 7B:
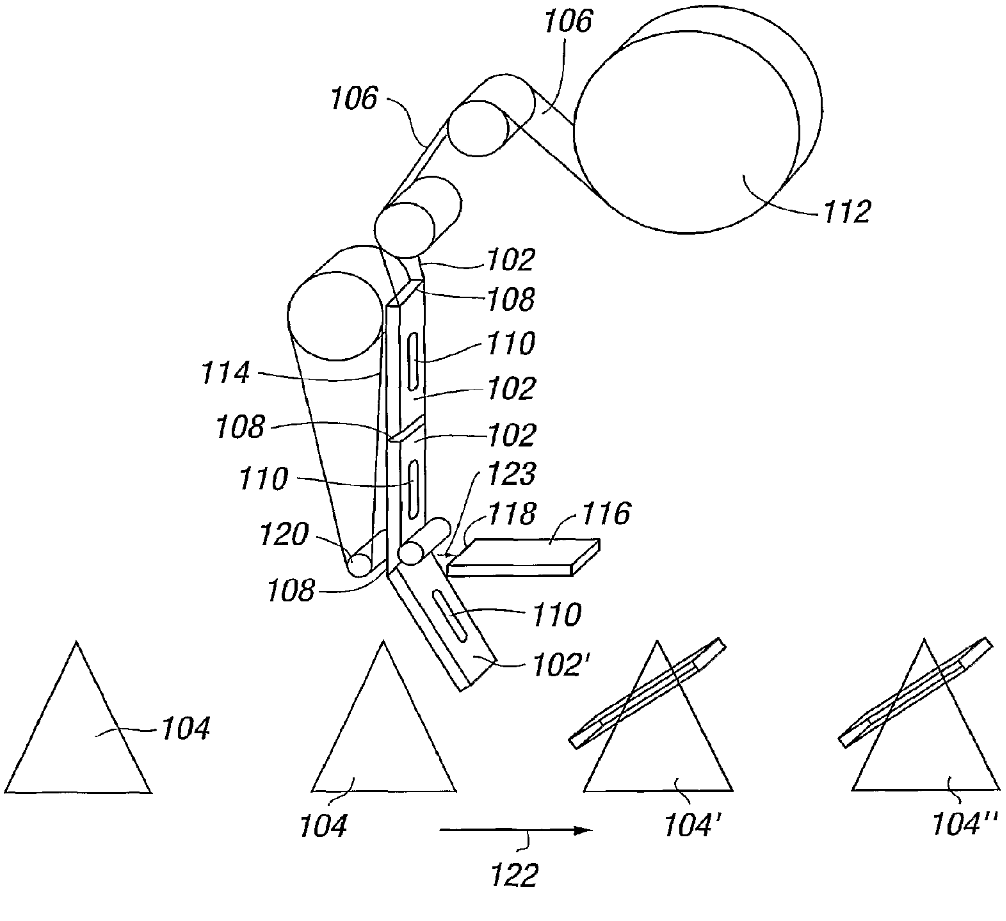

FIG. 7*b* shows the apparatus for applying label tags 102. In this case the line of labels 106 is provided from a roll 112 and passes through a number of guides and rollers to a servo drive belt 114 which supports the line of labels 106 to the application point defined by the separation tool 116 with protruding portion 118. The leading label tag 102' protrudes beyond nip pulley rollers 120 such that the passage 110 therein is exposed to a sufficient extent to engage with the top of the article 104 as it moves in direction 122. The mechanical location of the passage 110 with the article 104 moves the label tag 102' towards the tool portion 118 as indicated by arrow 123 which causes the protruding portion 118 to engage with the at least one aperture in the line of weakening at the trailing edge of the label tag 102' and hence encourages the tear of the same, as previously described, to allow the label to be fully applied to the article 104 as shown in the articles 104', 104''.

The present invention provides one or more apertures positioned at the exact line of weakening between adjacent labels in the label supply. The method in accordance with the invention ensures that the labels separate exactly along the line of weakening and thereby afford an exact definition of the leading edge of the next label to be applied. By combining this advantage with a support plate of the type shown in FIGS. 3 and 6 which is located close to the separation tool 20 which has defined the position of the leading edge of the next label, so a significant length of the next label is available which can be released from the carrier belt 60 which moves the label supply towards the tool by the movement of the first label either directly applied to the article such as in FIG. 6 or under the control of a secondary roller nip as in FIG. 3 which then carries the first label to the article by any other final application device such as an air blow system. In direct application the support plate places the leading edge of the label to the article surface in a timed relationship to the start of the label movement forward. This eliminates any variations in this movement caused by differing release moments and ensures a minimal number of different release belt specifications are required for a range of adhesives, reducing any time required for belt changes. The innovation also allows for an increase in the pulley diameter at the separation beak of the delivery belt which will increases belt life.

In one embodiment in addition to allowing the break of the line of weakening to be encouraged, the apertures 12 can also be used as location and/or drive means to allow the label substrate to be fed towards the point of application, for example a drive or transfer belt can be provided with a tool in the form of a pin or sprocket which locate in the respective apertures of the line of weakening. In one embodiment the sprocket in the aperture at the leading end of the label substrate can be used as the tool portion 21 which encourages that line of weakening at the leading end to break to free the leading label for application. In one embodiment the pins or sprockets are provided at spaced locations along the belt to allow the same to engage in apertures in the respective lines of weakening and hence drive the labels along the belt to the point of separation.

In whichever embodiment, when positioning the apertures, the following parameters may be addressed singly or in any combination, namely; the length of the line of weakening, the strength of the sheet material from which the labels are made; the perforation pattern for the line of weakening, the speed of movement of the label substrate and/or generally, the tensile strength of the substrate.

Typically the unwinding of the roll of label substrate is powered so as to avoid the weight of the label roll affecting the operation of the apparatus and the breaking of the lines of weakening.

Importantly, in the current invention the tool separates the leading label via the line of weakening without any significant lateral deflection of the label path being required. In one embodiment the leading line of weakening is broken and the feed label is driven onwards or, alternatively, the label is first advanced and then the line of weakening is broken.

There is therefore provided apparatus which does not require the label supply feed to be stopped and only slowing of the feed rate may be required so that the article to which the label is applied can be moved away before the next label reaches the point of application.

The invention claimed is:

1. Apparatus for the separation of a leading label from a label supply, said apparatus including means for advancing a label supply to a point of label application, said label supply having a first planar surface having a release layer applied thereto and an opposing planar surface having a layer of adhesive applied to at least a portion thereof, said label supply having a series of labels defined therein by lines of weakening, and means for separating the leading label from the supply of labels to allow the same to be applied to an article, wherein said means for separating include a tool positioned such that at least one protruding portion of the tool contacts and locates with an aperture formed along the line of weakening so as to commence the breaking of the line of weakening and the remainder of the line of weakening is formed by microperforations and characterized in that the width of the at least one aperture which is engaged by the tool is substantially the same as the width of the adjacent microperforations.

2. Apparatus according to claim 1 wherein the breaking of the line of weakening is commenced once a portion of the label has been applied to the article by adhesive or mechanical location, subsequent movement of the article and label bringing the line of weakening into contact with the tool.

3. Apparatus according to claim 1 wherein the label supply is fed through first and second sets of rollers, and the line of weakening which is to be broken is located between the two sets, with the tool located between the two sets at a position such that the protruding portion thereon engages with the aperture formed along the line of weakening.

4. Apparatus according to claim 3 wherein the contact between the protruding portion and the aperture in the line of weakening is encouraged by a selective drive and/or drive speed of the first and second sets of rollers.

5. Apparatus according to claim 1 wherein the tool is provided to be relatively movable with respect to the label supply so as to allow the protruding portion on the tool to be selectively moved into the aperture in the line of weakening.

6. Apparatus according to claim 1 wherein there is provided a support plate which lies between first and second sets of rollers and towards which the label supply is encouraged to be positioned.

7. Apparatus according to claim 6 wherein the support plate has an aperture shaped so as to allow the tool to pass therethrough and into contact with the label supply to break the line of weakening.

8. Apparatus according to claim 1 wherein the tool includes two or more spaced protruding portions, each portion provided to be locatable in a respective aperture formed along the line of weakening in the label supply at the same spacing.

9. Apparatus according to claim 1 wherein the speed of feed of the labels will be substantially the same as the speed of feed of the articles to which the labels are to subsequently be applied.

10. Apparatus according to claim 1 wherein there is relative movement between the tool and a label feed means during one cycle of operation so as to allow the leading edge of the leading label to be held in a defined position and then applied to the article accurately whereupon the trailing edge of the leading label is separated from the label supply via the tool.

11. Apparatus according to claim 1 wherein the tool is provided with a 3 dimensional profile and first and second sets of rollers are provided, a first set on one side of the line of weakening which is to be broken and a second set on the opposing side of the line of weakening.

* * * * *